(12) United States Patent
Moore et al.

(10) Patent No.: US 11,176,839 B2
(45) Date of Patent: Nov. 16, 2021

(54) PRESENTATION RECORDING EVALUATION AND ASSESSMENT SYSTEM AND METHOD

(71) Applicants: Michael Moore, West Nyack, NY (US); Amit Soni, Madison Hts. (IN)

(72) Inventors: Michael Moore, West Nyack, NY (US); Amit Soni, Madison Hts. (IN)

(*) Notice: Subject to any disclaimer, the term of this patent is extended or adjusted under 35 U.S.C. 154(b) by 0 days.

(21) Appl. No.: 15/866,642

(22) Filed: Jan. 10, 2018

(65) Prior Publication Data

US 2019/0378427 A1 Dec. 12, 2019

Related U.S. Application Data

(60) Provisional application No. 62/444,508, filed on Jan. 10, 2017.

(51) Int. Cl.
| | |
|---|---|
| *G09B 5/06* | (2006.01) |
| *G06F 16/22* | (2019.01) |
| *G06F 40/103* | (2020.01) |
| *G10L 21/055* | (2013.01) |

(52) U.S. Cl.
CPC ............ *G09B 5/065* (2013.01); *G06F 16/22* (2019.01); *G06F 40/103* (2020.01); *G10L 21/055* (2013.01)

(58) Field of Classification Search
CPC . G09B 5/065; G09B 5/12; G09B 7/04; G09B 19/00; G09B 19/025; G09B 5/06; G09B 7/00; G09B 7/08
See application file for complete search history.

(56) References Cited

U.S. PATENT DOCUMENTS

| | | | |
|---|---|---|---|
| 4,860,360 A | 8/1989 | Boggs | |
| 6,921,266 B2 | 7/2005 | Kon | |
| 7,264,475 B1 | 9/2007 | Eck et al. | |
| 7,346,527 B2 | 3/2008 | McKay et al. | |
| 7,664,317 B1 | 2/2010 | Sowerby | |
| 8,319,834 B2 | 11/2012 | Jain | |
| 8,532,986 B2 | 9/2013 | Matsumoto | |
| 9,031,837 B2 | 5/2015 | Homma | |
| 9,336,268 B1 * | 5/2016 | Moudy | G06F 40/30 |
| 2007/0297643 A1 * | 12/2007 | Uehori | G06F 40/103 382/100 |
| 2008/0005130 A1 * | 1/2008 | Logan | G06F 16/639 |
| 2012/0236201 A1 * | 9/2012 | Larsen | H04N 21/439 348/468 |

(Continued)

*Primary Examiner* — Eddy Saint-Vil
(74) *Attorney, Agent, or Firm* — Andrew Morabito

(57) ABSTRACT

A method for evaluating and assessing a presentation for deviations, comprising receiving a first set of materials, wherein the first set of materials are associated with a presentation syllabus, receiving a recording of the presentation, creating an evaluated compilation of the presentation, wherein the evaluated compilation comprises an integration of the first set of materials with the recording of the presentation, assessing the evaluated compilation in relation to a predetermined set of requirements, wherein the predetermined set of requirements are based on audio and visual aspects of the recording of the presentation,
indexing each instance where one of the predetermined set of requirements are triggered from the evaluated compilation, and generating a report based on the triggering of the predetermined set of requirements.

14 Claims, 4 Drawing Sheets

(56) References Cited

U.S. PATENT DOCUMENTS

| | | | |
|---|---|---|---|
| 2014/0137144 A1* | 5/2014 | Jarvenpaa | H04N 21/25891 |
| | | | 725/13 |
| 2016/0189556 A1* | 6/2016 | Clark | G09B 7/02 |
| | | | 434/362 |
| 2016/0269510 A1* | 9/2016 | Sasaki | G06Q 30/02 |
| 2016/0300135 A1* | 10/2016 | Moudy | G06F 16/244 |
| 2017/0178527 A1* | 6/2017 | Srinivasan Natesan | G09B 5/02 |

* cited by examiner

PRESENTATION RECORDING EVALUATION AND ASSESSMENT SYSTEM AND METHOD

BACKGROUND

The present invention relates generally to the field of video analysis, and more particularly to analyzing a recording based on a predetermined curriculum and assessing the similarities between the curriculum and the recording which is expected to be covered in the lecture.

Throughout history and up until recently, the vast majority of classes or lectures for students, professionals, or those wishing to become educated on a subject would need to attend a live class or lecture. The teacher or professor presents the information to the student(s) in a manner that promotes retaining the information. Many of these teaches or professors use techniques from their experiences or education that helps the students retain the greatest amount of the information presented.

These live lectures are usually accompanied by a written textbook or literature to further assist the students by allowing them to reference this material before and after the lecture. In many instances the professor or teacher directs the lecture(s) based on the structure of the literature. For example, one live lecture may be directed to one chapter of the textbook. This structure has proven to be extremely beneficial as the literature and live lecture paired together provide a beneficial combination for the professor to clearly and timely present the information In the professional world, many organizations or corporations have training seminars to make sure the employees are knowledgeable about the company's rules, goals, products, and incentives. Many times, new employees need to go through several days of training to learn all the information the company desires their employees to know. These training sessions are typically paired with written materials for the employee to reference in the future if they have questions and a superior is not present.

The issue with the live lectures is that other than being present at the lecture, to perform an audit on the content of the lecture and the quality of the lecture was impossible. With modern technology the ability to record lectures has become increasing easier. However, to review the entirety of the lecture is a time consuming and strenuous task as the reviewer needs to know the written materials, the agenda or plan for that lecture, and the speaker's methods and styles of teaching to best understand if there are adhering to the curriculum and presenting the information in a clear and concise manner.

Therefore, a system or method is desired to perform an audit on a recording based on the written materials and live presentation to create a clear and concise understanding of what is presented, how it is presented, and provide an evaluation of the presentation.

SUMMARY

Aspects of an embodiment of the present invention disclose a method, computer program product, and a computer system for evaluating and assessing a presentation for deviations. A processor receives a first set of materials, wherein the first set of materials are associated with a presentation syllabus. A processor receives a recording of the presentation. A processor creates an evaluated compilation of the presentation, wherein the evaluated compilation comprises an integration of the first set of materials with the recording of the presentation. A process or assesses the evaluated compilation in relation to a predetermined set of requirements, wherein the predetermined set of requirements are based on audio and visual aspects of the recording of the presentation. A processor indexes each instance where one of the predetermined set of requirements are triggered from the evaluated compilation. A processor generates a report based on the triggering of the predetermined set of requirements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "frame", or "system." Furthermore, aspects of the present invention may take the form of a computer program product embodied in one or more computer readable medium(s) having computer readable program code/instructions embodied thereon.

The system, method, or computer program product provides the benefit of performing an audit and evaluation of a live or recorded presentation and if present any materials associated with the presentation. This audit and evaluation assists a reviewer in determining the positives and negatives of the presentation, through an evaluated report and version of the presentation. The evaluation of the presentation and be able to easily and quickly locate areas that the reviewer desires to further review or understand. This is accomplished by recording or receiving a recording of the presentation, analyzing the materials, and auditing the recording of the presentation.

This process eliminates the need to employ numerous people to travel or visit the live presentations, training programs, classes, courses, or lectures for the purpose of performing the audit. These people are then able to quickly review the audited presentation and report to concentrate on specific areas. This will support general cost reduction objectives, allows human resources to be more specifically deployed and a broader view of training/learning operations when they occur in multiple locations simultaneously. This system, method, or computer program further allows for the positive aspects as well as the defects, or deviations from the curriculum to be documented and easily located for coaching, discipline, praise, or education purposes. It also allows the defects/deviations documented to be easily used for other business purposes (coaching, discipline, improvement etc.)

The present invention will now be described in detail with reference to the Figures.

Figure 1:
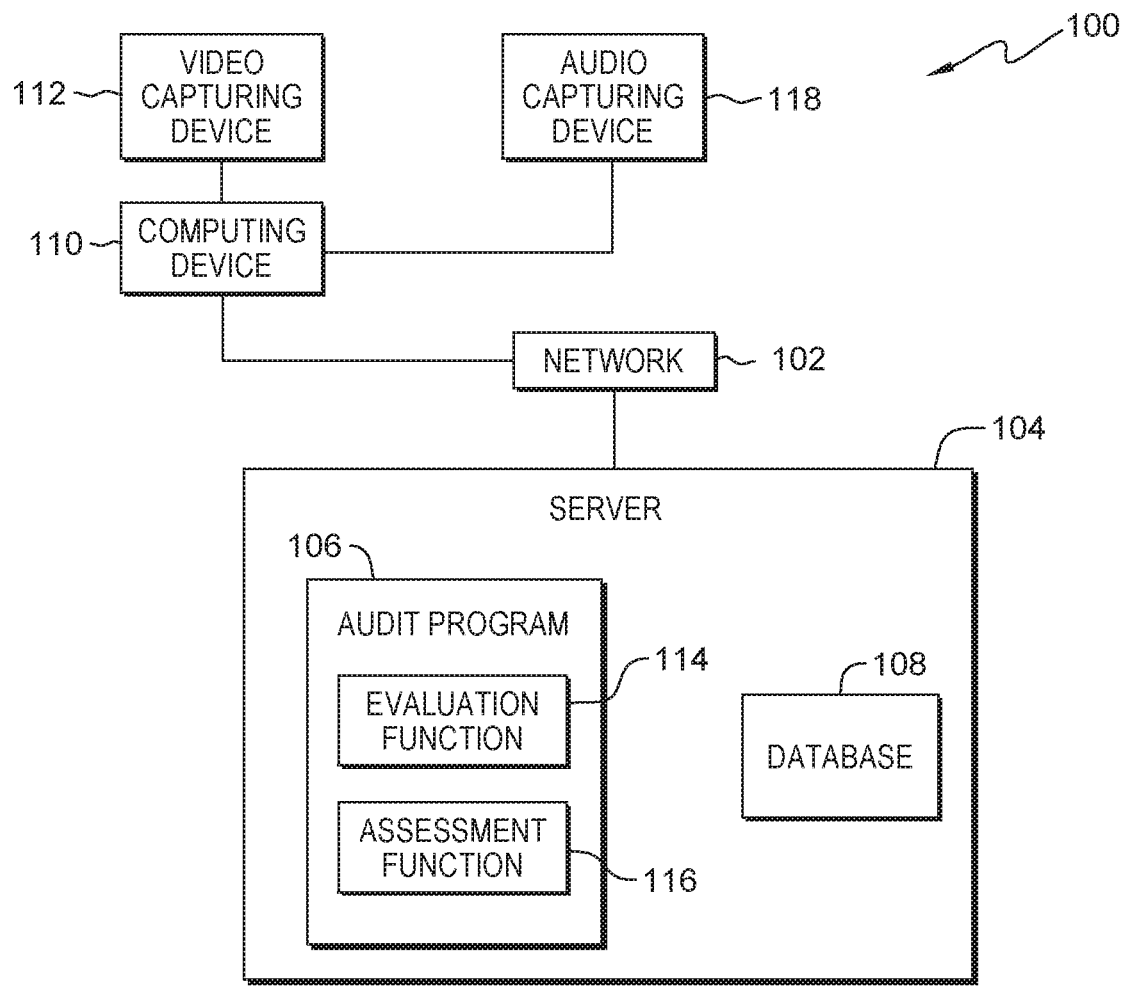
FIG. 1 depicts a block diagram depicting a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to network 102, server 104, computing device 110, video capturing device 112, and audio capturing device 118. Computing environment 100 may include additional computing devices, servers, components, or additional devices not shown. It should be appreciated FIG. 1 provides only an illustration of one implementation and does not imply any limitations with regards to the environments in which different embodiments may be implemented. Many modifications to the depicted environment may be made.

Network 102 may be a local area network (LAN), a wide area network (WAN) such as the Internet, any combination thereof, or any combination of connections and protocols support communications between server 104, computing device 110, and additional computing devices connected to network 102 in accordance with embodiments of the invention. Network 102 may include wired, wireless, or fiber optic connections.

Server 104 may be described in the general context of computer system executable instructions, such as program modules, being executed by a computer system. Generally, program modules may include routines, programs, objects, components, logic, data structures, and so on which perform particular tasks or implement particular abstract data types. In additional embodiments, server 104 may be a desktop computer, laptop computer, tablet computer, netbook computer, personal computer (PC), a desktop computer, mobile device, or any programmable electronic device capable of receiving a signal or data from computing device 110 and additional computing devices connected to network 102. In additional embodiments, server 104 may be practiced in distributed cloud computing environments where tasks are performed by remote processing devices which are connected through a communications network. In a distributed cloud computing environment, program modules may be located in both local and remote computer system storage media including memory storage devices. In the depicted embodiment, server 104 contains audit program 106, database 108 and is connected to network 102. In additional embodiments, audit program 106, database 108, evaluation function 114, and assessment function 116 may be located on other devices provides server 104 may access audit program 106, database 108 via network 102.

Audit program 106 performs the evaluation of the live presentation, the audit of the written materials associated with the live presentation, and the assessment of the live presentation and the written materials to categorize and present the assessment in a usable context and manner. In the depicted embodiment, the audit program 106 is located on the server 104 with evaluation function 114 and assessment function 116. In additional embodiments, audit program 106 may be located on additional servers provided audit program 106 has access to database 108, computing device 110, evaluation function 114, assessment function 116, and additional devices connected to network 102.

Database 108 may be a repository that may be written to and/or read by audit program 106. Information gathered from audit program 106 may be stored to database 108 as well as curriculums, presentation video(s) and audio, evaluation criteria, account information, and other information that is required for the evaluation and assessment to take place. In one embodiment, database 108 is a database management system (DBMS) used to allow the definition, creation, querying, update, and administration of a database (s). In the depicted embodiment, database 108 resides on server 104. In other embodiments, database 108 resides on another server, or another computing device, if database 108 is accessible to audit program 106, evaluation function 114, assessment function 116, computing device 110.

Computing device 110 may be a management server, a web server, or any other electronic device or computing system capable of processing program instructions and receiving and sending data. In some embodiments, computing device 110 may be a laptop computer, tablet computer, netbook computer, personal computer (PC), a desktop computer, smart phone, or other programmable electronic device capable of communicating with server 104, video capturing device 112, audio capturing device 118, audit program 106, evaluation function 114, assessment function 116, and database 108 via network 102. In other embodiments, driver computing device 110 may represent a server computing system utilizing multiple computers as a server system, such as in a cloud computing environment. In another embodiment, driver computing device 110 represents a computing system utilizing clustered computers and components to act as a single pool of seamless resources. In the depicted embodiment, driver computing device 110 communicates with video capturing device 112, audio capturing device 118, and server 104, via network 102. In other embodiments, computing device 110 may include any combination of audit program 106, evaluation function 114, assessment function 116, video capturing device 112, audio capturing device 118, and database 108.

Video capturing device 112 is a photographic device capable of taking rapid sequences of photographs. Video capturing device 112 can be, for example a movie camera, film camera, cine-camera, video camera, or other forms of imaging gathering devices. In the depicted embodiment, video capturing device 112 is connected to computing device 110. In other embodiments, video capturing device 112 may be connected to server 104 or other computing devices provided audit program 106, evaluation function 114, assessment function 116, and database 108 can communicate with video capturing device 112.

Evaluation function 114 uses the recorded audio and video in combination with the presentation materials to determine if the live presentation and the information within the materials are covered. If the covered information is presented in a predetermined order or if there are deviations. If the live presentation progresses at a predetermined rate, if the materials are covered in the presentation. In the depicted embodiment, evaluation function 114 is integrated into the audit program 106 located on server 104. In additional embodiments, evaluation function 114 may be located on other computing devices together or separate from audit program 106 provided evaluation function 114 can communicate with the audio capturing device 118, the video capturing device 112, assessment function 116, audit program 106, and database 108.

Assessment function 116 takes the information gathered from the evaluation function 114 and annotates the audio and video footage to allow a third party to easily identify deviations from the curriculum, defects in the presentation or materials, areas where improvement could be beneficial, or an assessment score of the presentation and/or materials. In the depicted embodiment, assessment function 116 is integrated into the audit program 106 located on server 104. In additional embodiments, assessment function 116 may be located on other computing devices together or separate from audit program 106 provided assessment function 116 can communicate with the audio capturing device 118, the video capturing device 112, evaluation function 114, audit program 106, and database 108.

Audio capturing device 118 is an acoustic-to-electric transducer or sensor which converts the sounds in air into an electrical signal. Audio capturing device 118 can be, for example a dynamic, electret condenser, piezoelectric, or any other form or style of microphone which convert acoustic sounds into an electrical signal. In the depicted embodiment, audio capturing device 118 is connected to computing device 110. In other embodiments, audio capturing device 118 may be connected to server 104 or other computing devices provided audit program 106, evaluation function 114, assessment function 116, and database 108 can communicate with audio capturing device 118. In some embodiments, video capturing device 112 and audio capturing device 118 are integrated into a single device such as most modern-day cameras with microphones or modern-day smartphones.

Figure 2:
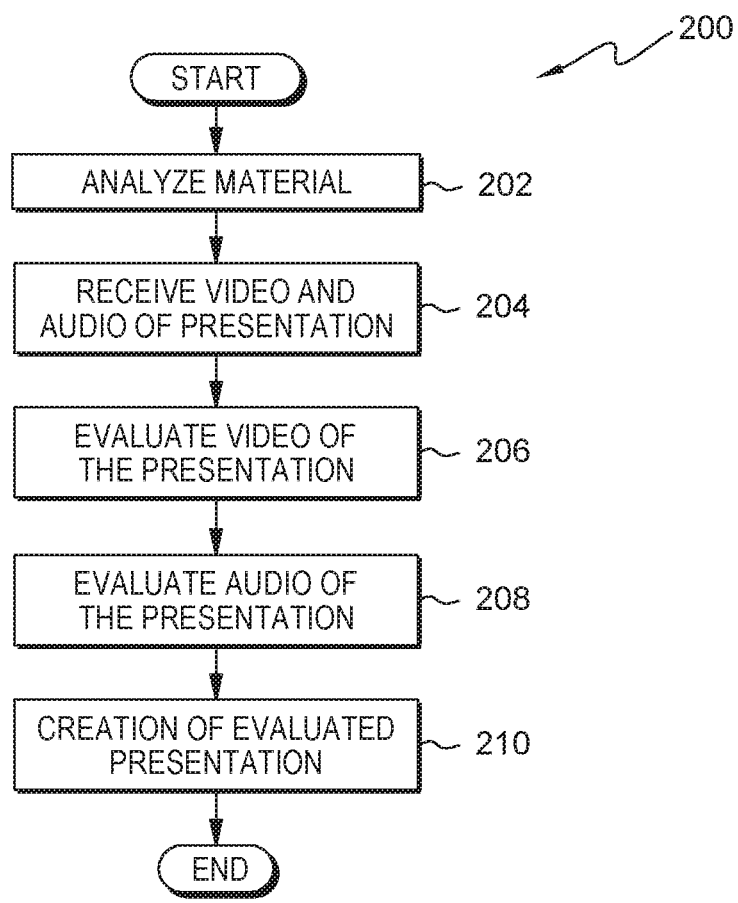
FIG. 2 depicts a flowchart of the operational steps taken by audit program to analysis a video based on a predetermined curriculum, within computing environment 100 of FIG. 1, in accordance with an embodiment of the present invention.

FIG. 2 depicts a flowchart of the operational steps taken by evaluation function 114 to evaluation the written materials and the presentation audio and video, within computing environment 100 of FIG. 1, in accordance with an embodiment of the present invention. FIG. 2 provides an illustration of one embodiment and does not imply any limitations regarding computing environment 100 in which different embodiments may be implemented. Many modifications to the depicted flowchart may be made.

In step 202, evaluation function 114 analyzes the materials. The evaluation function 114 analyzes the materials to determine the content, topics, order (progression of the presentation), beginning, end, chronological order of presentation, major topics, minor topics, illustrations, questions, headings, structure of information, and various other features o aspects of the materials that will be used in the presentation, covered in the presentation, or used to structure the presentation. This will assist the evaluation function 114 to create a framework from the material to be covered during the presentation and create at least one marker for the evaluation function 114 to determine if the presentation progression and the material progression are similar, and also to determine if the presentation is on pace to cover the associated materials, e.g. running short or long based on the allotted time. The materials are any written materials which are associated with the presentation. These materials may be in electronic or hardcopy format. This can be in the form of a textbook, slideshow, notes, handouts, slide show, images, or the like. If the materials are in a hardcopy format, the evaluation function 114 may us the video capturing device to scan or analyze the content and then process into a format which evaluation function 114 is able to use conjunction with the presentation.

In some embodiments, the material is uploaded to the audit program 106 or stored on database 108. In additional embodiments, evaluation function 114 locates the materials through an automated process to index predetermined and preselected information, by crawlers, cutters, or cognitive computing. In some embodiments, evaluation function 114 receives specific information about the materials, such as, but not limited to, date of lecture, lecture title, trainer identification, lecture size, corporate compliance, curriculum compliance such as content, allotted time per topic, lecture checkpoints, and languages spoken. This content is used to establish the content and context of the presentation, by understanding the materials the evaluation function 114 is able to understand what the presenter is hoping to cover. In additional embodiments, evaluation function 114 may analyze additional materials that are associated with the presentation, such as manuals which are provided based on the evaluation that is to be performed.

In some embodiments, evaluation function 114 analyzes the materials provided and the materials gathered through the progression of the materials and establishes predetermined points to create a timeline for the lecture based on the materials. This timeline is used to further assist the evaluation program 114 to make sure a timeline is being maintained. For example, if the materials are one hundred pages, it may create a "marker" at twenty-five-page increments to make allow for easy access when reviewing the video, but to also determine the time spend on each section. In some embodiments, evaluation function 114 analyzes the topics or portions of the materials and provides an importance or relevance score to each topic or portion. This assists the evaluation function 114 analyze the audio and video to confirm the inclusion of these topics or portions of the materials in the live or record presentation.

In step 204, evaluation function 114 receives the audio and video of the presentation. The evaluation function 114 may receive either the audio, the video, or both of the presentation. This may be provided in real-time or after the completion of the presentation. In some embodiments, evaluation function 114 receives a raw version of the presentation with no edits modifications or editing. In other embodiments a pre-editing may be performed to remove non-important portions or excess footage or audio, e.g. deadtime at the beginning, end, or breaks of the presentation that was recorded.

In step 206, evaluation function 114 analyzes the video portion of the presentation. Evaluation function 114 receives the presentation video and extracts predetermined factors and data from the video. Evaluation function 114 analyzes the positioning, movement, mannerisms, facial characteristics, use of space, and other visual factors captured in the video that are used to evaluate the performance of the presenter based on a predetermined set of analyzed characteristics. In one embodiment, evaluation function 114 evaluates a set of predetermined features or elements of the video and creates an annotation of the video for when the specific events occur or are absent. In some embodiments, evaluation function evaluates materials written by the presenter during the presentation, e.g. on a whiteboard or board. These are then converted to written materials and compiled with the other materials to create a complete data set of the materials covered in the presentation. This evaluation is accomplished through third party or integrated video capturing technology and biomechanical analyses to determine the occurrence or absence of the predetermined set of factors the evaluation function 114 is programmed to evaluate.

In step 208, evaluation function 114 evaluates the audio portion of the presentation. Evaluation function 114 evaluates the audio data of the presentation to determine the audible aspects of the presentation based on a predetermined set of evaluation topics. In some embodiments, the evaluation function 114 performs a transcription process of the audio, using transcription programming and software. In additional embodiments, the evaluation function evaluates the aspects of the audio file, e.g. tone of voice, background noise, inflections in the speaker(s) voice, pauses, and other features of the speaker(s) spoken words. In one embodiment, the evaluation function 114 is able to distinguish between the presenter and each member of the audience, for example, questions asked by the audience. In some embodiments, the audio segmented based on the analyze of the materials and the video (if either are present), and the audio is segmented in substantially the same points as the material and/or video, to allow for easy determine as to where along the presentation the audio is. In some embodiments, a form of cognitive computing, voice analytics, or audio analyzes is used to perform the audio analyzes of the presentation.

In some embodiments, the audio and video are analyzed substantially simultaneously. In other embodiments, they are analyzing in unison to create an evaluated version of the presentation with the audio and video synced together.

In step 210, evaluation function creates the evaluated presentation. The evaluated presentation integrates the materials with the presentation to create a linkage between the two. This may include the comparison of the chronological order of the materials compared to the presentation. This evaluated version of the presentation maybe in a video, audio, and textual format with connection means between the one or more. For example, the video may have textual representation of what is being said integrated into the video, and the audio may be used to create markers in the video for when specific topics are reached.

In one embodiment, for example, the evaluated presentation may create a breakdown of the presentation based on the audio, video, and materials in a structure as follows:
Introduction
Section 1 explanation
Section 1 clarification
Exercise 1
Break
Review Section 1
Section 2 explanation
Section 2 clarification
Exercise 2
Break
Review section 1 & 2
Request feedback
Describe day 2 activities
Wrap up
Dismiss Wherein the evaluation function 114 is able, for example, to use the material structure to determine the seconds, and by the use of the video is able to determine the breaks or when the exercises are performed, and the explanation versus clarification, and the wrap-up based on the audio of the presentation.

Figure 3:
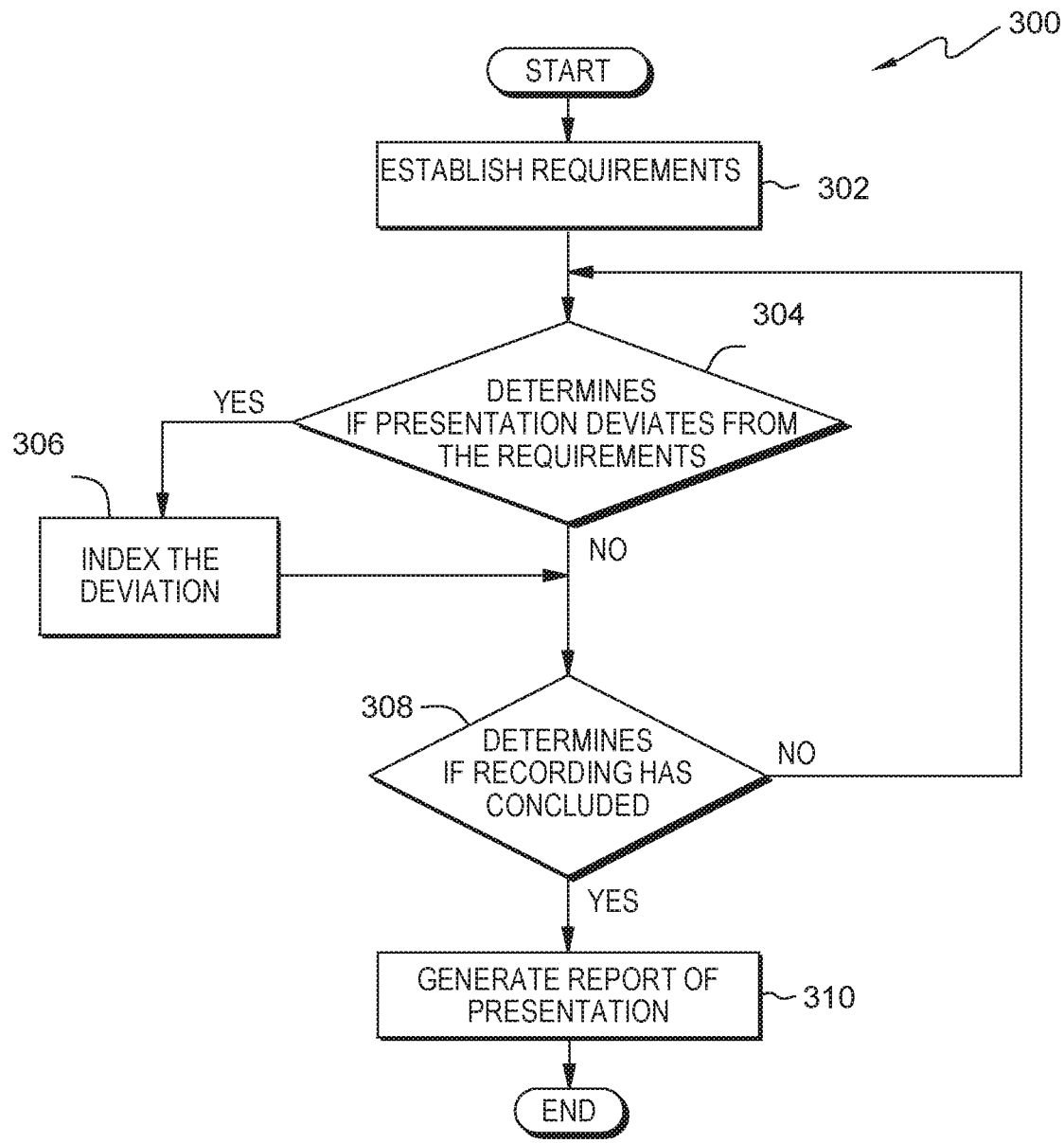
FIG. 3 depicts a flowchart of the operational steps taken by audit program to analysis a video based on a predetermined curriculum, within computing environment 100 of FIG. 1, in accordance with an embodiment of the present invention.

FIG. 3 depicts a flowchart of the operational steps taken by assessment function 116 to audit the written materials in-combination with the presentation audio and video, within computing environment 100 of FIG. 1, in accordance with an embodiment of the present invention. FIG. 3 provides an illustration of one embodiment and does not imply any limitations regarding computing environment 100 in which different embodiments may be implemented. Many modifications to the depicted flowchart may be made.

In step 302, assessment function 116 establishes the requirements for the review of the evaluated presentation. This evaluated presentation includes the annotated video and audio in combination with the materials. Performed by the evaluation function 114. The assessment function 116 confirms that the audio, video, and annotations are substantially aligned in terms of occurrence of the events and are properly associated with the materials. If the audio and video are not properly aligning, the assessment function 116 is unable to properly analyze the evaluated presentation. The assessment function 116 in reviewing the evaluated presentation, establishes a set of requirements which are to be analyzed. These requirements may be, but not limited to, factors associated with the materials, audio, or video, which the assessment function 116 is reviewing for deviation from. In some embodiments, the requirements may be positive aspects of the presentation instead of negatives.

In decision 304, assessment function 116 determines if the evaluated presentation has deviated from the requirements for the presentation. Assessment function 116 has a predetermined set of factors and data which is selected for the presentation to coincide with. For example, if the materials are laid out in three (3) segments (first, middle, last), and the video and/or audio begins with the last section, and the assessment function 116 was evaluating the presentation for order. This would be a measurable deviation the assessment function 116 would determine from the factors established. In other embodiments, these factors may be, but not limited to, talking incoherently, unnecessary mannerisms, speed of talking, time spent on a specific section or topic, deviation from the topics, or other issues a presenter may encounter while presenting. The factors may be novice or professional presenters. The benefit of the process is to detect and analyze techniques that are harmful or distracting to a presenter. The requirements can be predetermined, preprogrammed, or selected or deselected. For example, if a presenter is working on keeping on topic, the assessment function 116 may ignore erratic movements of the presenter. In additional embodiments, if a presenter does not cover the major or minor predetermined topics, the assessment function 116 would review the evaluated presentation to determine this after the conclusion of the presentation. If assessment function 116 determines that there is no deviation from the requirements (NO BRANCH, proceed to decision 308) assessment function 114 determines if the end of the video has been reached. If assessment function 116 determines that there was a deviation from the requirements (YES BRANCH, proceed to step 306) assessment function 116 indexes the deviation.

In step 306, assessment function 116 indexes the deviation from the requirements. Assessment function 116 creates an index of the deviation from the requirements. In one embodiment, the video and/or audio is marked, tagged, or noted, with the deviation. In some embodiments, additional information associated with the deviation, e.g. the type of deviation color coding, or the like may be applied with index for further assistance when reviewing the presentation. In additional embodiments, the assessment function 116 creates a separate document listing the at least one deviation, such as, the time of the deviation, the cause for the deviation, and potential recommendations for correction of the deviation. If recommendations are provided, the assessment function 116 provides at least on recommendation based on a predetermined set of characteristics associated with the deviation from database 108.

In some embodiments, the type of deviations which is assessed is customizable by the assessment function 116. For example, if the user is interested in seeing when they stray from the main topic or have extended pauses. They can request the assessment function 116 to analyze these specific deviations over other potential deviations.

In decision 308, assessment function 116 determines if the presentation has concluded. The conclusion of the presentation may be the end of the audio or video, but may also be at the end of a predetermined segment of a larger presentation or other variables that are applied. For example, if the presentation has four (4) segments, the assessment function 116 may conclude after the first segment at the request of the user. If assessment function 116 determines the presentation has concluded (YES BRANCH, proceed to step 310) assessment function 116 generates the report of the presentation. If assessment function 116 determines the conclusion of the presentation has not been reached (NO BRANCH, proceed to decision 304) assessment function 116 determines if the presentation deviates from the requirements.

In step 310, assessment function 116 generates a report of the presentation. The report may include the deviations, a presentation score based on these deviations, a copy of the video or audio with the annotations. The report provides a detailed description of the presentation and the positive and negative aspects of the presentation, so the presenter can review their presentation and acquire constructive feedback to improve future presentations. In additional embodiments, assessment function 116 scores the lecture via the annotations and provides this information to the designated personnel to review and provide individual comments and notes. In some embodiments, an immediate notification is sent upon the detection of the deviation. The notification may be various forms of electronic messages. In some embodiments, the report is customizable based on the predetermined set of the recorded deviations, wherein the user can select what deviation type or segment of the recording they are interested in gathering the information about. In some embodiments, the deviation is accompanied by recommendation(s) to correct the deviation, and provide, links to video where the deviation is corrected or not present, or information that is beneficial to both the person reviewing the evaluated presentation.

In some embodiments, assessment function 116 can operate in real time to analyze the lecture video providing near immediate notice of deviation via messaging or email services to allow for immediate correction of the action. These messages are sent to predetermined people including the person leading the lecture to allow for a nearly immediate correction of the problem.

Figure 4:
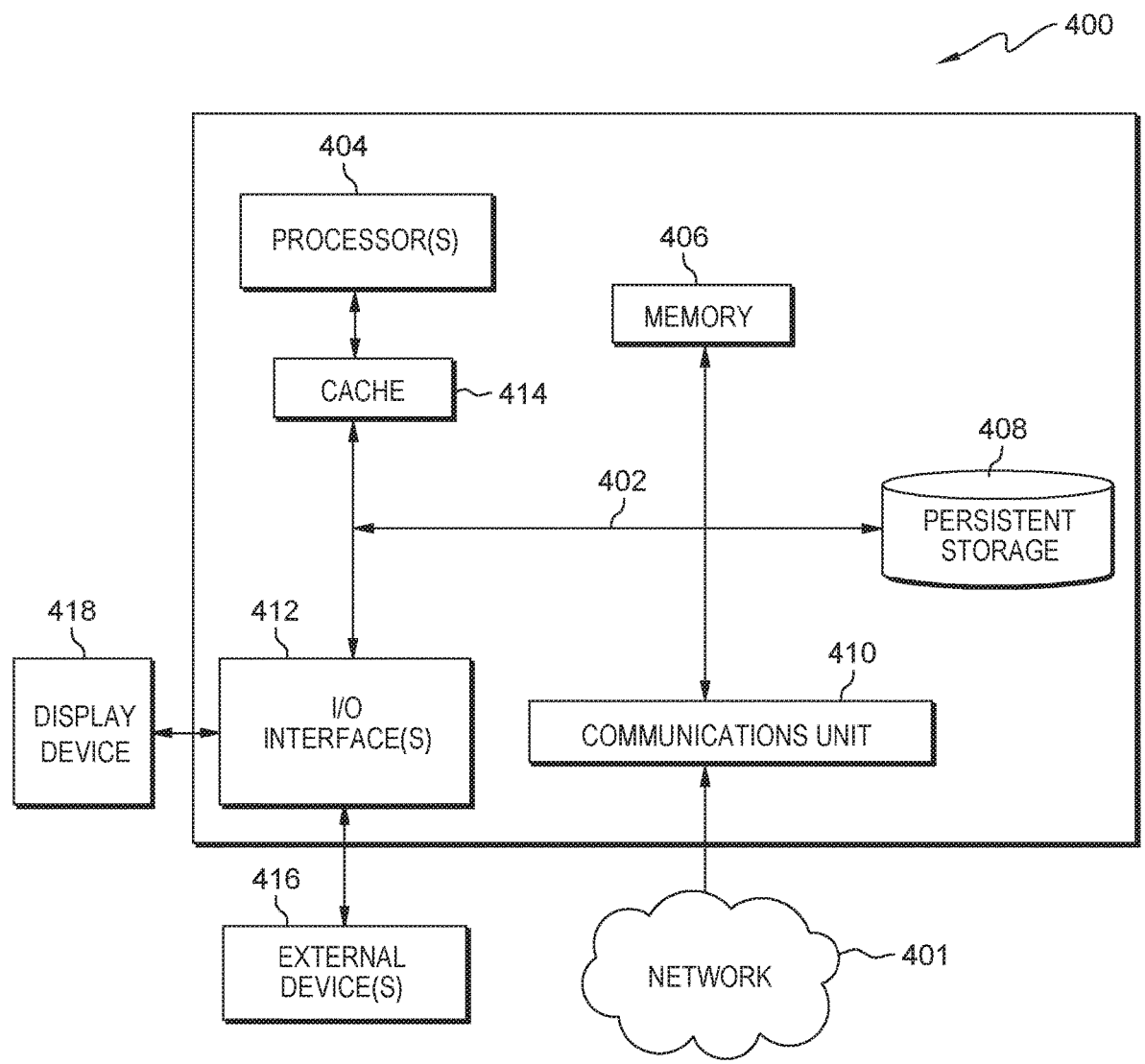
FIG. 4 depicts a block diagram depicting the internal and external components of the server of FIG. 1, in accordance with one embodiment of the present invention.

FIG. 4 depicts a block diagram 400 of components of a computing device (e.g. computing device 110 or server 104), in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made. It should be appreciated FIG. 1 provides only an illustration of one implementation and does not imply any limitations with regard to the environments in which different embodiments may be implemented.

Computing environment 400 is, in many respects, representative of the various computer subsystem(s) in the present invention. Accordingly, several portions of computing environment 400 will now be discussed in the following paragraphs.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any additional hardware components within a system. For example, communications fabric 402 can be implemented with one or more buses.

Computing device 400 is capable of communicating with other computer subsystems via network 401. Network 401 can be, for example, a local area network (LAN), a wide area network (WAN) such as the Internet, or a combination of the two, and can include wired, wireless, or fiber optic connections. In general, network 401 can be any combination of connections and protocols that will support communications between computing device 400 and other computing devices.

Memory 406 and persistent storage 408 are computer-readable storage media. In one embodiment, memory 406 includes random access memory (RAM) and cache memory 414. In general, memory 406 can include any suitable volatile or non-volatile computer-readable storage media.

Memory 406 is stored for execution by one or more of the respective computer processors 404 of computing device 400 via one or more memories of memory 406 of computing device 400. In the depicted embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in the examples, provides for communications with other data processing systems or devices, including computing device 400. In the examples, communications unit 410 includes one or more network interface cards. Communications unit 410 may provide communications through the use of either or both physical and wireless communications links.

I/O interface(s) 412 allows for input and output of data with other devices that may be connected to computing device 400. For example, I/O interface 412 may provide a connection to external devices 416 such as a keyboard, keypad, camera, a touch screen, and/or some other suitable input device. External devices 416 can also include portable computer-readable storage media such as, for example, thumb drives, portable optical or magnetic disks, and memory cards. Software and data used to practice embodiments of the present invention, e.g., regulation program 420 can be stored on such portable computer-readable storage media and can be loaded onto persistent storage 408 of computing device 400 via I/O interface(s) 412 of computing device 400. Software and data used to practice embodiments of the present invention, e.g., regulation program 420 can be stored on such portable computer-readable storage media and can be loaded onto persistent storage 408 of computing device 400 via I/O interface(s) 412 of computing device 400. I/O interface(s) 412 also connect to a display 418.

Display 418 provides a mechanism to display data and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

What is claimed is:

1. A method for evaluating and assessing a presentation for deviations, the method comprising:
   receiving, by one or more processors, a first set of materials, wherein the first set of materials are associated with a presentation syllabus;
   receiving, by the one or more processors, a recording of the presentation, wherein the presentation includes video and audio data;
   manipulating, by the one or more processors, the first set of materials, and the video and audio data to create a compilation of the presentation;
   comparing, by the one or more processors, audio and visual aspects of the compilation to a predetermined set of requirements, wherein the predetermined set of requirements are based on audio and visual aspects of the recording of the presentation and the first set of materials;
   analyzing, by the one or more processors, a first set of data for markers, wherein the markers are associated with a specific topic of the first set of materials;
   incorporating, by the one or more processors, the markers into the video and audio data, wherein the specific topic is identified in the video and audio data;
   indexing, by the one or more processors, each instance where one of the predetermined set of requirements is triggered based on a discrepancy in the compilation and the predetermined set of requirements; and generating, by the one or more processors, an interactive report based on the indexing.

2. The method for evaluating and assessing a presentation for deviations of claim 1, wherein the evaluation of the recording of the presentation uses language analytics for the audio portion of the presentation.

3. The method for evaluating and assessing a presentation for deviations of claim 1, wherein the indexing of each instance where one of the predetermined set of requirements is triggered, further comprises, identifying, by the one or more processors, at least one recommendation for the indexed instance where one of the predetermined set of requirements is triggered.

4. The method for evaluating and assessing a presentation for deviations of claim 1, further comprising synchronizing, by the one or more processors, the audio and video data of the recording of the presentation.

5. A computer usable program product comprising one or more computer-readable storage devices, and program instructions stored on at least one of the one or more storage devices, the stored program instructions comprising:
   program instructions to receive a set of materials, wherein the set of materials are associated with a presentation syllabus;
   program instructions to receive a recording of a presentation, wherein the recording is comprised of audio and video data;
   program instructions to create a compilation of the presentation, wherein the compilation comprises an integration of the set of materials with the recording of the presentation, and wherein the set of material are synced with the recording of the presentation;
   program instructions to create a table of content of the compilation;
   program instructions to assess the compilation in relation to a predetermined set of requirements;
   program instructions to index each instance where the compilation deviates from one of the predetermined set of requirements, and provides a recommendation for the deviation integrated into the compilation; and
   program instructions to generate a report based on the deviations of the predetermined set of requirements.

6. The computer usable program instructions of claim 5, further comprising program instructions to incorporate of a second set of materials gathered from the recording of the presentation.

7. The computer usable program instructions of claim 5, wherein the assessment of the recording of the presentation uses language analytics for the audio portion of the presentation.

8. The computer usable program instructions of claim 5, wherein the indexing of the at least one instance where one of the predetermined set of requirements is triggered further comprises, identifying at least one recommendation for the indexed instance.

9. The computer usable program instructions of claim 5, wherein the receiving of the set of data, further comprising, program instructions to analyze, the set of data for markers, wherein the markers are used when creating the evaluated compilation and establishing a time line for the evaluated compilation.

10. The computer usable program instructions of claim 5, wherein the video data is analyzed for motion detection.

11. The computer usable program instructions of claim 5, further comprising, analyzing the set of materials to determine different sections, wherein the set of material is divided into sections.

12. The computer usable program instructions of claim 5, further comprising, generating, a manipulated presentation, wherein the deviations are marked and actionable from a user interface.

13. A computer system for evaluating and assessing a presentation for deviations, the method comprising:
   one or more computer processors, one or more computer readable storage media, and program instructions stored on the one or more computer readable storage media for execution by at least one of the one or more processors, the program instructions comprising:
   program instructions to receive a presentation syllabus;
   program instructions to receive, and a recording of the presentation wherein the recording of the presentation includes audio and video data;
   program instructions to create a compilation of the presentation, wherein the compilation comprises an integration of the presentation syllabus with the recording of the presentation, and wherein the presentation syllabus are synced with the recording of the presentation;
   program instructions to indicate where a set of topics of the presentation syllabus are synced with the recording of the presentation;
   program instructions to assess the compilation in relation to a set of requirements, wherein the set of requirements identify deviations from the presentation syllabus;
   program instructions to index each instance where the assessment identifies a deviation from the presentation syllabus;
   program instructions to incorporate at least one recommendation into the compilation; and
   program instructions to manipulate an altered video to identify each instance where a deviation is indexed, and generating a report identifying the deviations and related information.

14. The computer system of claim 13, wherein the creation of the compilation, further comprises program instructions to segment the compilation into more than one segment.

\* \* \* \* \*